(12) United States Patent
Furusho (10) Patent No.: US 10,210,230 B2
(45) Date of Patent: Feb. 19, 2019

(54) INFORMATION PROCESSING SYSTEM AND COMPUTER PROGRAM

(71) Applicant: TURBO DATA LABORATORIES, INC., Kanagawa (JP)

(72) Inventor: Shinji Furusho, Kanagawa (JP)

(73) Assignee: TURBO DATA LABORATORIES, INC., Kanagawa (JP)

( * ) Notice: Subject to any disclaimer, the term of this patent is extended or adjusted under 35 U.S.C. 154(b) by 253 days.

(21) Appl. No.: 15/265,086

(22) Filed: Sep. 14, 2016

(65) Prior Publication Data

US 2017/0075969 A1    Mar. 16, 2017

(30) Foreign Application Priority Data

Sep. 14, 2015  (JP) .................................. 2015-181119

(51) Int. Cl.
 *G06F 7/00* (2006.01)
 *G06F 17/30* (2006.01)

(52) U.S. Cl.
 CPC .... *G06F 17/30569* (2013.01); *G06F 17/3053* (2013.01); *G06F 17/30312* (2013.01)

(58) Field of Classification Search
 None
 See application file for complete search history.

(56) References Cited

U.S. PATENT DOCUMENTS

| | | | |
|---|---|---|---|
| 7,617,265 B2 | 11/2009 | Ito et al. | |
| 7,899,851 B2 | 3/2011 | Ito et al. | |
| 8,280,840 B2 | 10/2012 | Mineno | |
| 8,639,670 B2 | 1/2014 | Mineno | |
| 2002/0095397 A1* | 7/2002 | Koskas | G06F 17/30324 |
| 2004/0172376 A1* | 9/2004 | Kobori | H04L 29/12594 |
| 2007/0016555 A1 | 1/2007 | Ito et al. | |
| 2007/0174843 A1* | 7/2007 | Furusho | G06F 13/4243 |
| | | | 719/318 |
| 2008/0281843 A1* | 11/2008 | Furusho | G06F 9/52 |
| 2008/0281849 A1* | 11/2008 | Mineno | G06F 17/30566 |
| 2010/0023480 A1 | 1/2010 | Ito et al. | |
| 2011/0238947 A1* | 9/2011 | Nishiguchi | G06F 12/1036 |
| | | | 711/207 |
| 2012/0323841 A1 | 12/2012 | Mineno | |

FOREIGN PATENT DOCUMENTS

| | | |
|---|---|---|
| JP | 6-335165 A | 12/1994 |
| JP | 2007-25735 A | 2/2007 |
| WO | 2007/083371 A1 | 7/2007 |

* cited by examiner

Primary Examiner — Tuan A Pham
(74) Attorney, Agent, or Firm — Kenealy Vaidya LLP (57) ABSTRACT

Unit conversion of data in a database is performed, so that efficient use of data can be achieved. VL and VNo in an index associated with each field of a table, define correspondence between a record number and a field value. In the n-th entry of VNo, a rank of the entry in VL is registered where the field value associated with the record having n-th record number in the table is registered. When the system of units of the value registered in VL is not a predetermined system of unit, VLC is provided, so as to apply unit conversion to the value in each entry of VL and to register the converted value in the entry on the same rank in VLC. Then, instead of VL, VCL and VNo define the correspondence between the record number and the field value.

4 Claims, 8 Drawing Sheets

INFORMATION PROCESSING SYSTEM AND COMPUTER PROGRAM

This application claims priority benefit under 35 U.S.C. 119 to Japanese Patent Application No. 2015-181119 filed on Sep. 14, 2015, the disclosure of which is incorporated herein by reference in its entirety.

FIELD OF THE INVENTION

The present invention relates to a technique of unit conversion of data in a database.

BACKGROUND OF THE INVENTION

As techniques for displaying data in a database, there is known a technique that provides indexes such as B-tree and Hash, and by using those indexes, the database is searched for data, so as to display the retrieved data (e.g., Japanese Unexamined Patent Application Publication No. 2007-25735, referred to as "patent document 1" and Japanese Unexamined Patent Application Publication No. 6-335165, referred to as "patent document 2").

As techniques of unit conversion of data in a database, there is known a technique that, when data of the database is requested by an application, performs a unit conversion process for converting the unit of data in conformity with the unit used in the application, and provides the converted data to the application that has requested the data (e.g., see International Patent Application Publication No. WO2007/083371).

According to a technique that performs unit conversion of data when data of a database is used, like the aforementioned technique which performs the unit conversion process when data of the database is provided, it is necessary to perform the unit conversion process every time data is used, with respect to individual data. Therefore, a processing load for the unit conversion is heavy, and accordingly, this prevents efficient use of data. By way of example, if large volume of data is utilized, the unit conversion process is performed individually on such large volume of data, resulting in that a long time is required until the unit conversion of data is completed, failing to use data promptly.

An object of the present invention is to perform unit conversion of data in a database, so as to use the data more efficiently.

BRIEF SUMMARY OF INVENTION

In order to achieve the object as described above, according to the present invention, there is provided an information processing system for processing a table having plural records each including one or plural fields, and record numbers being given to the records, respectively, and the information processing system includes a storage means that stores an index being provided in association with each field, an index editing means, and a data processing means that determines a field value of the record in the table, by using the index. The index includes a value list registering in entries, values used as the field values, of the records in the table, and a correspondence list defining correspondence between the record number and a rank of each entry of the value list where the field values are registered, respectively in association with the records having the record numbers. The index editing means creates a list of values after unit conversion in the index that includes the value list, when the value list registers values expressed in a unit different from a predetermined unit of the index, converts the values registered in the entries in the value list into values expressed in the predetermined unit, and registers the converted values into entries of the list of values after unit conversion, respectively on the same ranks as the entries in the value list. The data processing means determines as the field value, as to which the list of values after unit conversion does not exist in the index associated with the record having the record number, a value registered in the entry of the value list on the rank associated with the record number, as defined by the correspondence list of the index, and determines as the field value, as to which the list of values after unit conversion exists in the index associated with the record having the record number, a value registered in the entry of the list of values after unit conversion, on the rank associated with the record number as defined by the correspondence list of the index.

In order to achieve the object above, according to the present invention, there is provided an information processing system for processing a table having plural records each including one or plural fields, and record numbers being given to the records, respectively, and the information processing system includes a storage means that stores an index being provided in association with each field, an index editing means, and a data processing means that determines a field value of the record in the table, by using the index. The index includes a value list registering in entries, values used as the field values of the records in the table, and a correspondence list defining correspondence between the record number and a rank of each entry of the value list where the field values are registered, respectively in association with the records having the record numbers. The index editing means updates registered in the entries in the value list, to values expressed in a predetermined unit, as to each entry of the value list where the values are expressed in a unit different from the predetermined unit of the index. The data processing means determines as the field value of the record associated with each record number, a value registered in the entry of the value list, on the rank associated with the record number as defined by the correspondence list of the index which is associated with the field.

In order to achieve the object as described above, according to the present invention, there is provided an information processing system for processing a table having plural records each including one or plural fields, and record numbers being given to the records, respectively, and the information processing system includes a storage means that stores an index being provided in association with each field, an index editing means, and a data processing means determines the record number of the record having a specific value as a specific field value. The index includes a value list registering in entries, values used as the field values of the records in the table, and a correspondence defining correspondence between a rank of each entry of the value list, and the record number having the field value registered in the entry on the rank of the value list. The index editing means creates a list of values after unit conversion in the index that includes the value list, when the values in the value list are expressed in a unit different from a predetermined unit of the index, converts the values registered in the entries in the value list into values expressed in the predetermined unit, and registers the converted values into entries of the list of values after unit conversion, respectively on the same ranks as the entries of the value list. The data processing means determines as the record number of the record that has the specific value as the specific field value, the record number being associated with the rank of the entry in the value list where the specific value is registered, as defined by correspondence information of the index, when the list of values after unit conversion does not exist in the associated index, and determines as the record number of the record that has the specific value as the specific field value, the record number being associated with the rank of the entry in the list of values after unit conversion where the specific value is registered, as defined by correspondence information of the index, when the list of values after unit conversion exists in the associated index.

In order to achieve the object as described above, according to the present invention, there is provided an information processing system for processing a table having plural records each including one or plural fields, and record numbers being given to the records, respectively, and the information processing system includes a storage means that stores an index being provided in association with each field, an index editing means, and a data processing means that determines the record number of the record having a specific value as a specific field value by using the index. The index includes a value list registering in entries, values used as the field values of the records in the table, and correspondence information defining correspondence between a rank of each entry of the value list, and the record number having the field value registered in the entry on the rank of the value list. The index editing means updates the values registered in the entries in the value list which registers the values being expressed in a unit different from a predetermined unit of the index, to values obtained by converting the values to be expressed in the predetermined unit. The data processing means determines as the record number of the record having the specific value as the specific field value, a record number which is defined by the correspondence information of the index associated with the specific field as a record number associated with the rank of the entry of the value list where the specific value is registered.

In order to achieve the object as described above, according to the present invention, there is provided an information processing system for processing a table having plural records each including one or plural fields, and record numbers being given to the records, respectively, and the information processing system includes a storage means that stores an index being provided in association with each field, an index editing means, and a data processing means that determines a field value of the record in the table, by using the index. The index includes, a value list registering in entries, values used as the corresponding field values of the records in the table, and a correspondence list defining correspondence between the record number and a rank of each entry of the value list where the field values are registered, respectively in association with the records having the record numbers; the index editing means creates a list of values after unit conversion and a conversion flag list, in the index including the value list, as to each value list where values expressed in a unit different from a given unit of the index are registered. The data processing means determines as a field value of the record associated with the record number, a value registered in the entry of the value list at a rank associated with the record number as defined by the corresponding list of the index, when the list of values after unit conversion and the conversion flag list do not exist in the associated index for the field value; determines as the field value of the record associated with the record number, a value obtained by converting the value registered in the entry of the value list on the rank corresponding to the record number as defined by the correspondence list, into a value expressed in the given unit, when the list of values after unit conversion and the conversion flag list exist in the associated index for the field value and an on-flag indicating conversion is already done, is not on in the entry in the conversion flag list on the rank corresponding to the record number as defined by the correspondence list in the index, followed by registering thus converted value into the entry of the list of values after unit conversion on the same rank as the entry of the value list, and registering the on-flag into the entry of the conversion flag list on the rank associated with the record number as defined by the correspondence list; and determines as the field value of the record associated with the record number, a value registered in the entry of the list of values after unit conversion on the rank associated with the record number as defined by the correspondence list, when the list of values after unit conversion and the conversion flag list exist in the associated index, and the on-flag is registered in the entry of the conversion flag list on the rank associated with the record number as defined by the correspondence list of the index.

In order to achieve the object as described above, according to the present invention, there is provided an information processing system for processing a table having plural records each including one or plural fields, and record numbers being given to the records, respectively, and the information processing system includes a storage means that stores an index being provided in association with each field, an index editing means, and a data processing means that determines a field value of the record in the table, by using the index. The index includes a value list registering in entries, values used as the field values of the records in the table, and a correspondence list defining correspondence between the record number and a rank of each entry of the value list where the field values are registered, respectively in association with the records having the record numbers. The index editing means creates a list of values after unit conversion and a conversion flag list, in the index including the value list, as to each value list where values expressed in a unit different from a predetermined unit of the index are registered. The data processing means determines as the field value of the record associated with the record number, a value registered in the entry of the value list on the rank associated with the record number as defined by the corresponding list of the index, when the list of values after unit conversion and the conversion flag list do not exist in the associated index; determines as the field value of the record associated with the record number, a value obtained by converting the value registered in the entry of the value list on the rank associated with the record number as defined by the correspondence list, into a value expressed in the predetermined unit, when the list of values after unit conversion and the conversion flag list exist in the index and an on-flag indicating conversion is already done is not registered in the entry of the conversion flag list on the rank associated with the record number as defined by the corresponding list of the index, followed by updating the value in the entry of the value list, to the value being converted, registering the on-flag in the entry of the conversion flag list on the rank associated the record number as defined by the correspondence list; and determines as the field value of the record associated with the record number, the value registered in the entry of the value list on the rank associated with the record number as defined by the correspondence list, when the list of values after unit conversion and the conversion flag list exist in the associated index, and the on-flag is registered in the entry of the list of conversion flag list on the rank associated with the record number as defined by the correspondence list of the index.

As discussed so far, according to the information processing system, once the unit of a value registered in each entry of the value list is converted, and the value after the unit conversion is registered in the entry of the list of values after unit conversion, or the value in the entry of the value list is updated with the converted value, it is not necessary to perform unit conversion on thus converted value redundantly, every time of processing relating to the field. In addition, as for a large-scale table, the number of entries in the value list, which corresponds to the number of field values, is expected to be reduced compared to the number of records in the table. Therefore, it is expected that unit conversion of the values registered in the entries of the value list should be completed at higher speed, than the case where the unit of the field value of all the records in the table are converted.

According to the present invention, it is possible to perform unit conversion of data in databases, so as to use data in a database more efficiently.

Consequently, unit conversion of data in a database can be achieved for efficient use of data.

BRIEF DESCRIPTION OF DRAWINGS

FIGS. 8a1, 8a2, and 8b illustrate examples of the process for acquiring field value according to the second embodiment of the present invention.

DESCRIPTION OF EMBODIMENTS

Figure 1:
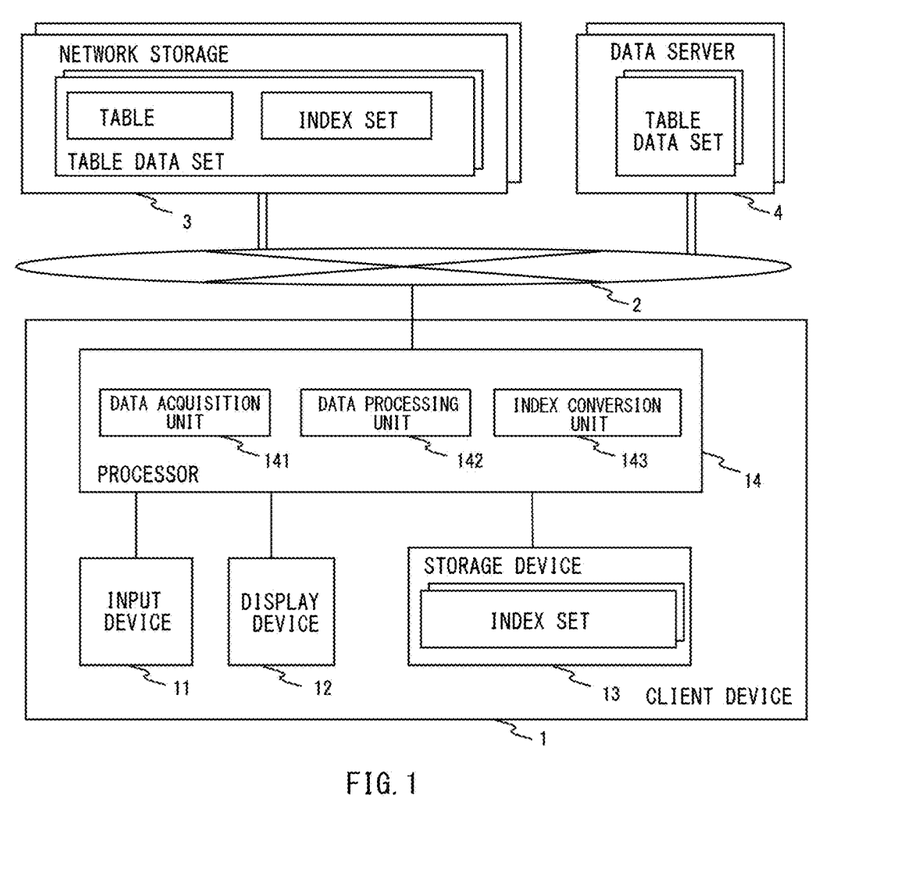
FIG. 1 is a block diagram showing an information processing system according to a first embodiment of the present invention.

Embodiments of an information processing system according to the present invention will now be described. A first embodiment will be described herein below. FIG. 1 shows a configuration of the information processing system according to the first embodiment. As illustrated, the information processing system incorporates a client device 1, and a network storage 3 and a data server 4, which are accessible by the client device 1 via a network 2 such as the Internet.

The client device 1 is provided with an input device 11, a display device 12, a storage device 13, and a processor 14. The processor 14 incorporates a data acquisition unit 141, a data processing unit 142, and an index conversion unit 143.

The processor 14 may be a general-purpose computer provided with a CPU, a memory, and various peripheral devices, for instance. The data acquisition unit 141, the data processing unit 142, and the index conversion unit 143 are implemented as functions of the computer, when the computer executes predetermined programs.

The network storage 3 and the data server 4 store RDB (Relational Database) tables, and index sets, each including indexes for the tables. For the sake of convenience, the table and the index set thereof will be collectively referred to as a "table data set", and each storage 4 stores one or plural table sets.

Figure 2A:
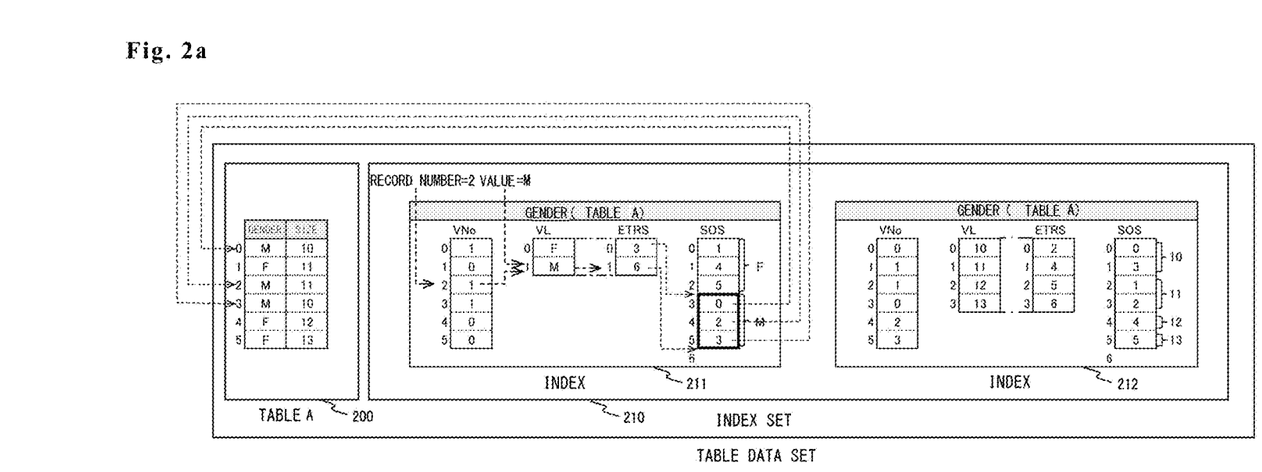
FIGS. 2a and FIG. 2b illustrate table data sets according to the first embodiment of the present invention.
Figure 2B:
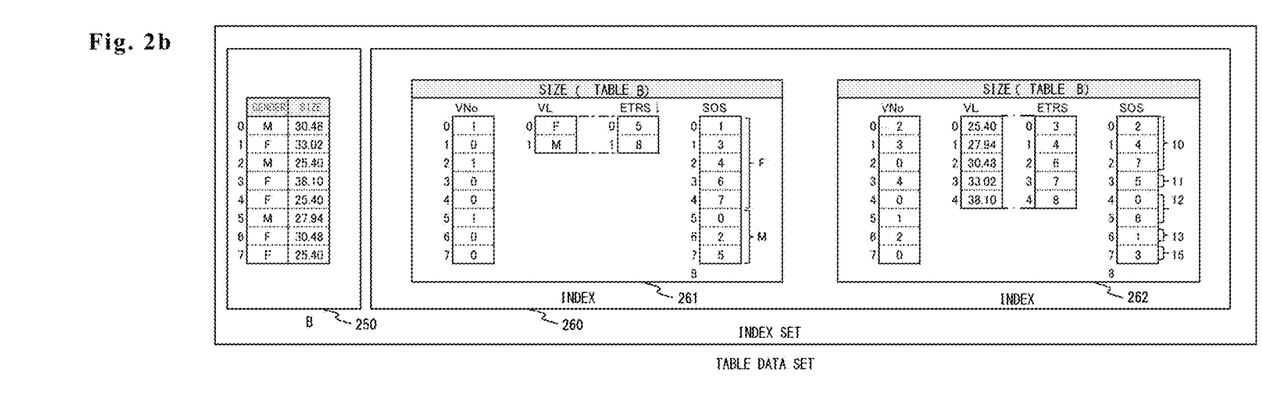

Next, FIG. 2 shows the table data set stored in the network storage 3 or in the data server 4. FIG. 2a illustrates the table data set of the table A, FIG. 2b illustrates the table data set of the table B. As illustrated, the table A 200, included in the table data set of the table A 200, has records in the form of rows, the record having plural fields ("Gender" and "Size" in FIG. 2a), and record numbers indicating the order of the rows (zero to five in FIG. 2a) are given respectively to the records in the table A 200. It should be noted that the record number starts from zero.

As shown in FIG. 2a, the index set 210 included in the table data set of the table A 200, comprises indexes that are provided respectively for the fields of the record in the table A 200. In FIG. 2a, since the fields of the record in the table A 200 are "Gender" and "Size", the "Gender" index 211 and the "Size" index 212 are included in the index set.

Similarly, as for the table B 250 shown in FIG. 2b, the table data set of the table B includes the table B 250 and the index set 260 for the table B 250, and the index set 260 of the table B 250 comprises the "Gender" index 261 and the "Size" index 262.

Each index comprises lists of VNo, VL, ETRS, and SOS (hereinafter, simply referred to as "VNo", "VL", "ETRS", and "SOS"). Here, VL is a list of values, used as field values in the associated field of the associated table, and the values are sorted according to a certain criteria and registered respectively in entries. By way of example, in the case of the "Gender" index 211 of the index set 210 in the table data set for the table A as shown in FIG. 2a, VL is a list that registers "F" and "M" in the entries, since only "F" and "M" are registered in the "Gender" field of the table A 200.

Next, VNo is a list of entries, the number of which is equal to the number of records in the associated table. In the n-th entry of VNo, there is registered a value indicating a rank of VL entry where the same value is registered as the field value of the record having the record number n in the associated table. It should be noted that ranks of the entries in each of VNo, VL, ETRS, and SOS starts from zero.

For the case of the "Gender" index 211 of the index set 210 in the table data set for the table A 200 as shown in FIG. 2a, the value in the "Gender" field of the record having the record number "1" in the table A 200 is "F", and the rank of entry where "F" is registered in VL is "0". Therefore, "0" is registered in the entry on the rank "1" of VNo. Similarly, the value in the "Gender" field of the record having the record number "3" in the table A 200 is "M", and the rank of entry where "M" is registered in VL is "1". Therefore, "1" is registered in the entry on the rank "3" of VNo.

Next, SOS is a list of entries, the number of which is equal to the number of records in the associated table. In the entries of SOS, the record numbers of the records in the associated table are registered, being sorted using the rank of entries in the VL list registering the corresponding field values as a first key, and the record number as a second key. In other words, the record number having a field value which is registered in the entry on a higher rank in VL, is registered on a higher rank in SOS. Among the records having the same field value, the record having smaller record number is registered on a higher rank in SOS.

By way of example, for the case of the "Gender" index 211 of the index set 210 in the table data set for the table A 200 as shown in FIG. 2a, field values "F" and "M" are registered in this order in the "Gender" field of VL. Therefore, the record numbers 1, 4, and 5 having value "F" as the value in the "Gender" field in the table A 200, are registered on higher ranks of the entries of SOS than the record numbers 0, 2, and 3 of the records having value "M" as the value in the "Gender" field. The record numbers 1, 4, and 5 of the records having "F" as the value of "Gender" field are registered sequentially in the entries from the top entry of SOS in the order according to the record numbers. In addition, the record numbers 0, 2, and 3 of the records having "M" as the value of "Gender" field are registered sequentially in the entries in SOS, in an order according to the record number, subsequent to the entries of the record numbers 1, 4, and 5 of the records having "F" as the value of the "Gender" field.

Next, ETRS is a list of entries, the number of which is equal to the number of the entries in VL. A value registered in each entry of ETRS indicates a rank, next lower than the end rank of the entries within a range in SOS, the range registering the record numbers of the records in the corresponding table, where the record numbers are associated with the same field value in VL, on the same rank as the rank in ETRS.

In other words, for the case of the "Gender" index 211 of the index set 210 in the table data set for the table A 200 as shown in FIG. 2a, "6" is registered in the entry on the second rank in ETRS. This is because, "M" is registered on the second rank in VL, the record numbers "0", "2", and "3" of the records having "M" in the "Gender" field of the table A 200, are registered in the SOS list, and the end rank of the range where the records having the record numbers "0", "2", and "3" are registered is "5".

Therefore, the value in the n-th entry in VNo represents a rank of the entry in VL, where the field value is registered in association with the record having the n-th record number in the associated table, as well as the value in the n-th entry in VNo represents the rank of the entry in ETRS. The rank of the entry in ETRS, represented by the n-th value in VNo, indicates a rank next lower than the end rank of the entries within a range in SOS, the range registering the record numbers of the records having, as a corresponding field value, the field value associated with the record having the n-th record number in the associated table.

According to the index as described above, it is possible to obtain the number of records in the associated table, on the basis of the number of entries in VNo. It is further possible to obtain a value of the field associated with the record having each record number, on the basis of VNo and VL. According to VL, ETRS, and SOS, it is possible to obtain the number of records and record numbers thereof in the associated table, the record having the same value in the associated field of the table.

By way of example, if the record number "2" is given as shown in FIG. 2a, the rank "1" is acquired as reference entry, which is registered in the entry of rank "2" in VNo. Then, the value "M" registered in the entry of rank "1" is acquired as a reference in VL, and "M" is the value of the "Gender" field of the given record having the record number "2".

The given value "M" is registered on the rank "1" in VL, and the value "6" is obtained which is registered on the same rank in ETRS. Then, referring to the registered value "6" on the same rank, the value "5", which is obtained by decrementing "6" by one, is acquired as the end rank. Next, referring to ETRS, the value "3" registered in the entry on the rank "0", which is one-rank higher in ETRS, is acquired as a start rank. Accordingly, the record numbers 0, 2, and 3 respectively registered in the entries in the range from the start rank "3" to the end rank "5" can be acquired as the record numbers of the records having the given value "M" in the "Gender" field. It should be noted that, if a given field value is registered in the entry on the rank "0" in VL, and accordingly the same rank in ETRS is "0", the start rank is set to "0".

Referring to FIG. 1 again, the data acquisition unit 141 in the processor 14 in the client device 1, acquires from the network storage 3 and/or the data server 4, index sets of table data sets for tables, as to which a user has requested processing such as displaying data on the client device 1, and those index sets are stored in the storage device 13.

Figure 3:
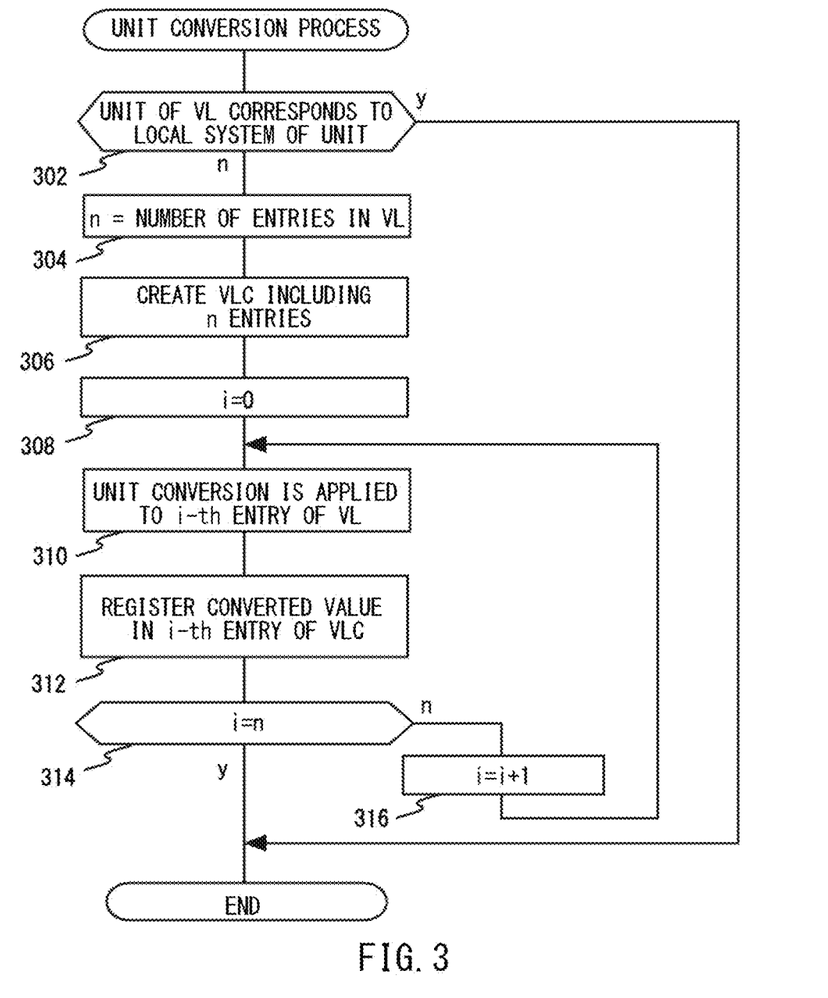
FIG. 3 is a flowchart of a unit conversion process according to the first embodiment of the present invention.

The index conversion unit 143 in the processor 14 performs a unit conversion process, as to each index in each of the index sets stored by the data processing unit 142 in the storage device 13. FIG. 3 shows procedures of the unit conversion process. As illustrated, the index conversion unit 143 in the processor 14 performs the unit conversion process as the following. Firstly, it is checked whether the unit of the value registered in VL of the index follows a local system of unit used in the client device 1 (step 302). By way of example, in the case where the length is expressed in inches in the client device 1 and the values registered in VL of the index are also expressed in inches, it is determined that the unit of the values registered in VL of the index follows the local system of unit used in the client device 1. On the other hand, if the values registered in VL of the index are expressed in centimeters, it is determined that the unit of the values registered in VL of the index does not follow the local system of unit used in the client device 1. Some examples may be considered as the case where the unit of values registered in VL of the index is different from the local system of unit used in the client device 1, including the followings; Celsius or Fahrenheit as the unit for expressing temperature, pound or kilogram as the unit for expressing weight, and pint or liter as the unit for expressing volume.

The index conversion unit 143 stores in advance, information as to what kind of units are used as the local system of units. In order to identify the unit of the value registered in VL of the index, the network storage 3 and/or the data server 4 may store meta-information describing data types and units of respective fields of a table, and such meta-information may be included in the index set. Then, in the unit conversion process, according to the meta-information included in the index set, the unit of the field associated with the index may be identified as the unit of the value registered in VL of the index. Alternatively, information of unit for each field in the table may be set by a user for unit processing, and the unit of values registered in VL of the index may be identified in the unit conversion process, according to thus preset unit information of the field associated with the index.

When the unit of the value registered in VL of the index is the same as the unit following the local system of unit used in the client device 1 (step 302), the unit conversion process for this index is terminated.

On the other hand, if the unit of the values registered in VL of the index is not the same as the unit following the local system of unit used by the client device 1 (step 302), a list of VLC (hereinafter, referred to as "VLC") having the same number of entries as the number of entries in VL is created in the index (steps 304 and 306).

Then, unit conversion is applied (step 310) to each entry (steps 308, 314, and 316) in VL, and the converted values are registered in VLC respectively on the same ranks as the entries in VL (step 312). In other words, if the unit of the values in the entries in VL is in centimeters, the value in each entry in VL is divided by 2.54, to convert the unit to the values in inches, and the converted values are stored on the same ranks as VLC.

Upon completion of the unit conversion of the values as to all the entries in VL, and registration of the values after the unit conversion into the entries on the same ranks in VLC as in the VL list (step 314), the unit conversion process for this index is finished.

Figure 4A:
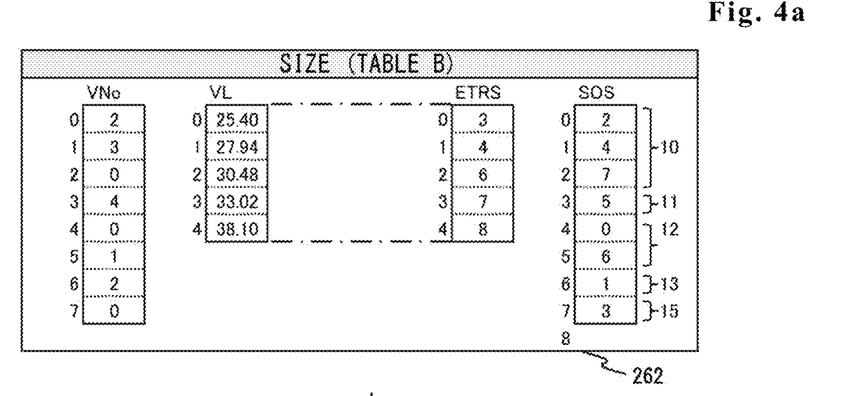
FIGS. 4a and 4b illustrates examples of the unit conversion process according to the first embodiment of the present invention.
Figure 4B:
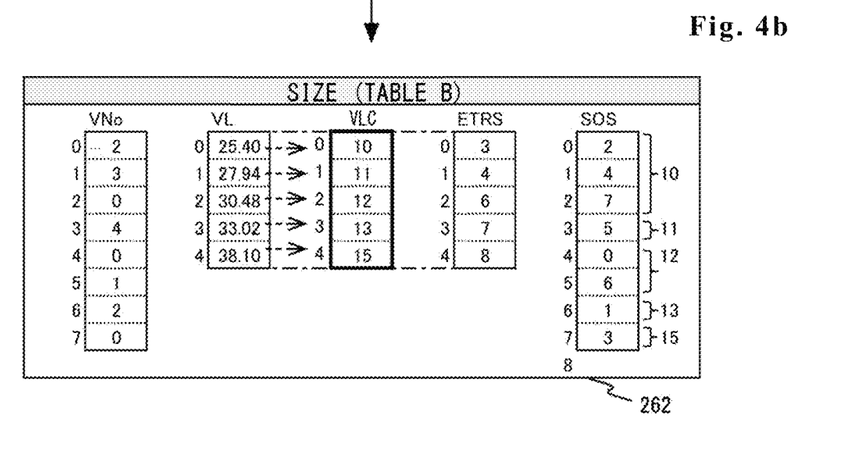

The unit conversion process performed by the index conversion unit 143 in the processor 14 has been described so far. According to thus described unit conversion process, the index 262 as shown in FIG. 4a is converted into the index 262 including VLC which is equivalent to the list obtained by converting the entries in VL into the values expressed in inches as shown in FIG. 4b, when data of size in centimeters is registered in the field "Size" in the table B 250 as shown in FIG. 2b, and values in centimeters are registered in the entries in VL of the index 262, in association with the field "Size" in the table B 250 as shown in FIG. 4a, whereas the length used in the client device 1 is expressed in inches.

Now, referring to FIG. 1 again, the data processing unit 142 in the processor 14 in the client device 1 uses the indexes stored in the storage device 13, so as to perform a process of reconstructing a table based on the indexes and displaying the table, a process of retrieving a record using a record number and a field value as keys, a process such as JOIN or UNION for combining plural tables, and any other various data processing.

Figure 5:
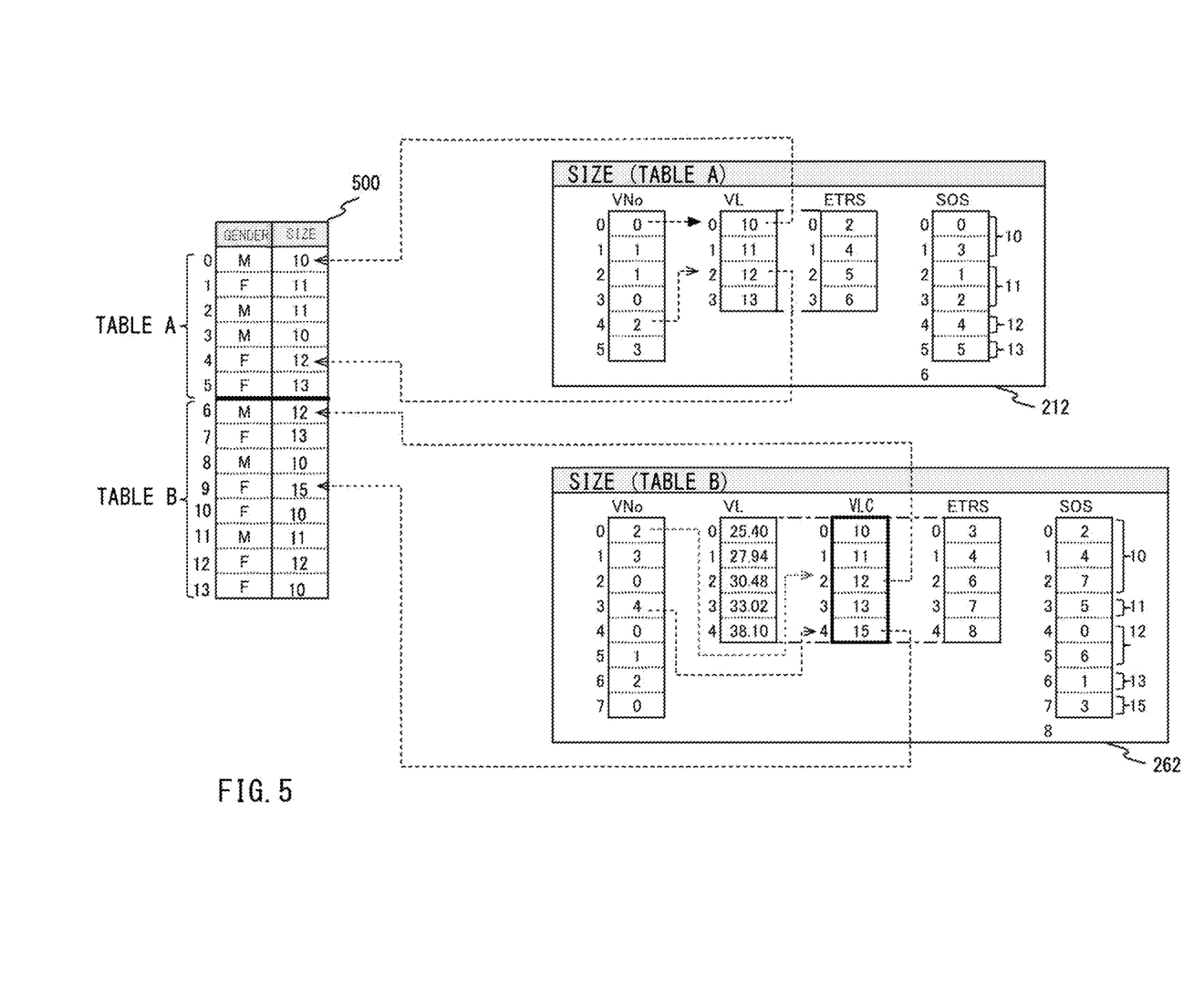
FIG. 5 illustrates an example of a union process according to the first embodiment of the present invention.

The data processing unit 142 performs the following processing, using VLC instead of VL, as for the index incorporating VLC, that is, assuming VLC as VL. FIG. 5 illustrates a processing example of the data processing unit 142, taking the UNION process as an example. FIG. 5 shows the case where a union table 500 is generated, obtained by combining the table A 200 and the table B 250 (UNION), in the order from table A 200 to table B 250.

As illustrated, the number of records in the table A 200 is six, and the number of records in the table B 250 is eight. Therefore, the union table 500 includes fourteen records, from the record number "0" to "13". The records having the record numbers from "0" to "5" in the union table 500 respectively correspond to the records having the record numbers from "0" to "5" in the table A 200. The records having the record numbers from "6" to "13" in the union table 500 respectively correspond to the records having the record numbers from "0" to "7" in the table B 250.

Then, the data processing unit 142 determines the value in each field of each record in the union table 500, according to the indexes 211 and 212 in the index set associated with the fields in the table A 200, when the records correspond to the records in the table A 200. Similarly, when the records in the union table 500 correspond to the records in the table B 250, the data processing unit 142 determines the value in each field of each record in the union table 500, according to the indexes 261 and 262 in the index set associated with the fields in the table B 250.

In determining the value in the field, VNo and VL are used when VLC is not included in the index used for the determination, whereas if VLC is included in the index, the determination is made by using VNo and VLC in the index.

By way of example, the value in the "Size" field of the record having the record number "0" in the union table 500 is determined as the following. The record associated with the record number "0" in the union table 500 corresponds to the record having the record number "0" in the table A 200. Since VLC is not included in the index 212 that is associated with the "Size" field in the table A 200, the value "0" registered in the entry of VNo is acquired as a reference rank, on the same rank "0" as the record having the record number "0" in the index 212. Then, the value "10" registered in the entry on the reference rank "0" in VL is determined as the value of the "Size" field of the record having the record number "0" in the union table 500.

Similarly, the record associated with the record having the record number "4" in the union table 500 corresponds to the record having the record number "4" in the table A 200. Since VLC is not included in the index 212 that is associated with the "Size" field in the table A 200, the value "2" registered in the entry of the VNo list is acquired as a reference rank, on the same rank "4" as the record having the record number "4" in the index 212. Then, the value "12" registered in the entry on the reference rank "2" in VL is determined as the value of the "Size" field of the record having the record number "4" in the union table 500.

The record associated with the record having the record number "6" in the union table 500 corresponds to the record having the record number "0" in the table B 250. Since VLC is included in the index 262 that is associated with the "Size" field in the table B 250, the value "2" registered in the entry on the rank "0" of VNo in the index 262, being the same rank as the record number "0" in table B 250 is acquired as a reference rank. Then, the value "12" registered in the entry on the reference rank "2" in VLC is determined as the value of the "Size" field of the record having the record number "6" in the union table 500.

Similarly, the record associated with the record having the record number "9" in the union table 500 corresponds to the record having the record number "3" in the table B 250. Since VLC is included in the index 262 that is associated with the "Size" field in the table B 250, the value "4" registered in the entry on the rank "3" of VNo in the index 262, being the same rank as the record number "3" is acquired as a reference rank. Then, the value "15" registered in the entry on the reference rank "4" in VLC is determined as the value of the "Size" field of the record having the record number "9" in the union table 500.

Here, the data processing unit 142 is capable of performing other various processing, in addition to the aforementioned UNION processing, by using the index including VLC. For example, the data processing unit 142 determines a record number of a record having a specific value in a specific field, using VLC instead of VL. In other words, if the index associated with the specific field includes VLC, a rank obtained by decrementing by one the value registered in the entry of ETRS on the same rank as the rank of the entry in VLC where the specific value of the index is registered, is set as an end rank. Next, referring to ETRS, the value registered in the entry on one-rank higher than the aforementioned rank in ETRS is acquired as a start rank. Then, the record numbers registered in the respective entries in a range from the start rank to the end rank in SOS are acquired as the record numbers of the records having the specific value in the specific field. It should be noted that if the rank of the entry in ETRS is "0", which is the same rank as the entry in VL where a given value is registered, the start rank is set to "0".

The first embodiment of the present invention has been described so far. In the aforementioned first embodiment, VLC is created and incorporated in the index for the unit conversion process, and the data processing unit 142 performs processing by using VL, when VLC is not included in the index, whereas VLC is used instead of VL, that is, assuming VLC as VL, when VLC is stored in the index.

Instead of incorporating the created VLC in the index in the unit conversion process, it is alternatively possible to consider the created VLC as a new VL, and this new VL substitutes for VL in the index. With this configuration, the index where VLC is stored is eliminated, and the data processing unit 142 is allowed to perform various processes, using the indexes in the same manner without exception. In other words, with the configuration above, it is possible to determine a value of the field of each record number in the aforementioned UNION, and to determine a record number of the record having a specific value in a specific field, by using the list of VL, in the similar manner as other indexes including VL where values in the entries are ineligible for unit conversion.

A second embodiment of the present invention will now be described. In the aforementioned first embodiment, for the index where values registered in VL are not expressed in the local system of units, the index conversion unit 143 performs the unit conversion of the values in the entries and registers the converted values in the entries of VLC, prior to the processing by the data processing unit 142. In the second embodiment, when a value in the entry of VL is used, the unit conversion is applied only to the value to be used and the converted value is registered in the entry of VLC.

Figure 6A:
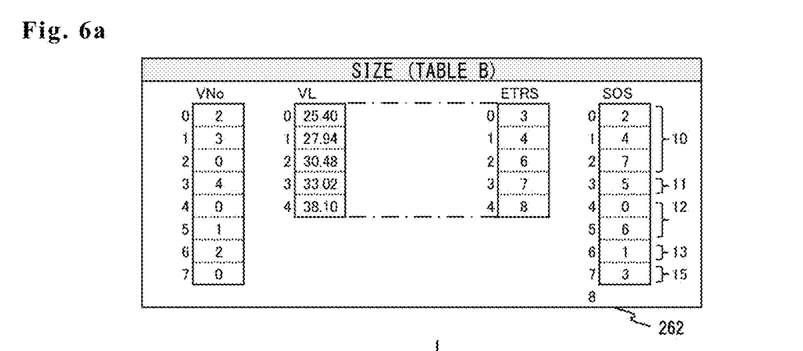
FIGS. 6a and 6b illustrates indexes used for the unit conversion in a second embodiment of the present invention.
Figure 6B:
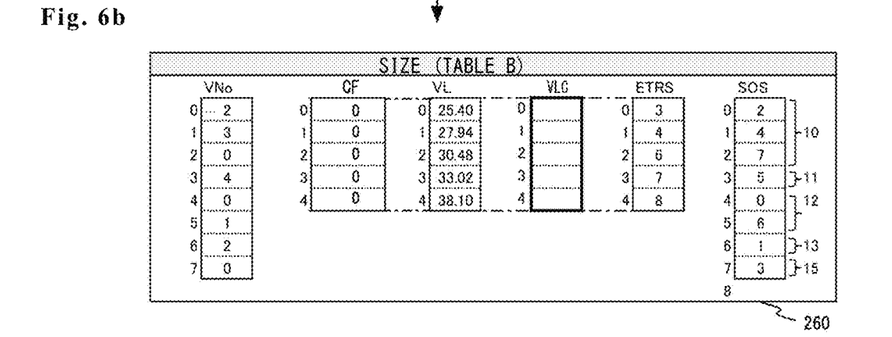

In the second embodiment, with regard to the index as shown in FIG. 6*a* where the unit of the values registered in VL of the index is different from the local system of units, among the indexes stored by the data processing unit 142 in the storage device 13, the index conversion unit 143 creates CF having the same number of entries as the entries in VL of the index, and further creates VLC having the same number of entries as the entries in VL of the index, as shown in FIG. 6*b*. In addition, "0" is registered in each entry of CF. At this stage, values are not registered in the entries in VLC of the index.

Figure 7:
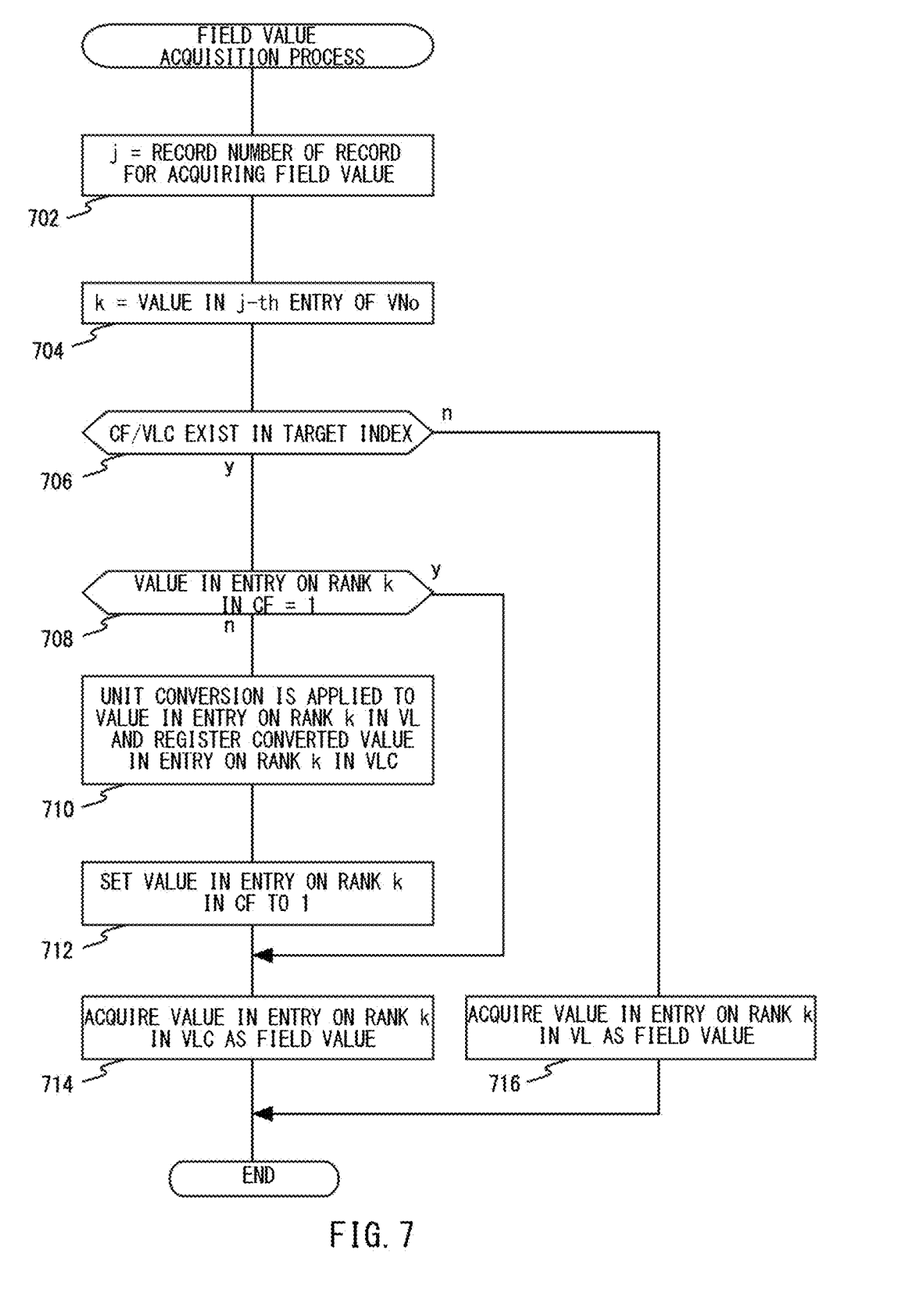
FIG. 7 is a flowchart of a process for acquiring field value according to the second embodiment of the present invention.

Meanwhile, the data processing unit 142 performs a field value acquisition process as shown in FIG. 7, so as to acquire a field value required for the processing, such as a process for reconstructing and displaying a table from the indexes stored in the storage device 13, a process for retrieving a record using the record number and field value as keys, a combining process such as JOIN and UNION of plural tables, and any other various data processing.

As illustrated, in the data processing unit 142, the record number of the record, as to which a field value is acquired, is assumed as "j" in the field value acquisition process (step 702). Then, a value assumed as "k", in the entry on the rank "j" in VNo of a target index is acquired, the target index being associated with the field in the index set of a pertinent table for acquiring the field value (step 704).

Then, it is checked whether the target index includes VLC and CF (step 706), and if the index includes neither VLC nor CF, the value in the k-th entry in VL is acquired as the target field value (step 716), and the field value acquisition process is finished.

On the other hand, if the target index includes VLC and CF (step 706), it is checked whether the value is "1" in the entry on the rank "k" in CF of the target index (step 708).

Next, if the value is not "1" in the entry on the rank "k" of the target index CF (step 708), the unit of the value in the k-th entry in VL is converted into the unit of the local system of units, and the converted value is registered in the k-th entry of VLC (step 710). Then, the value in the k-th entry in CF is set to "1" (step 712).

Then, the value in the k-th entry in VLC is acquired as the target field value (step 714), and the field value acquisition process is finished. On the other hand, when the value in the k-th entry in CF in the target index is determined as "1" in step 706, the value in the k-th entry in VLC is acquired as it is, as the target field value (step 714), and the field value acquisition process is finished.

Figure 8A:
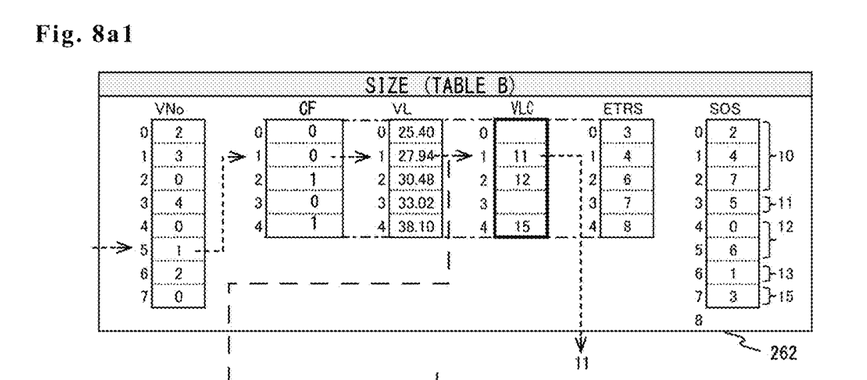
Figure 8A:
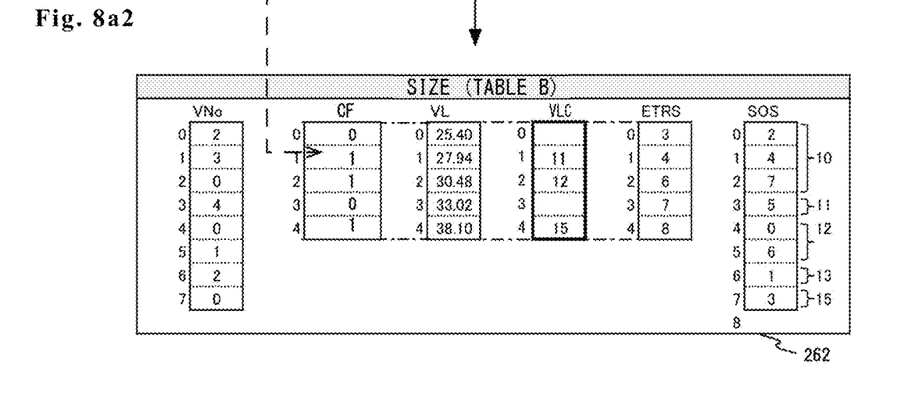

The field value acquisition process performed by the data processing unit 142 has been described so far. FIGS. 8*a*1, 8*a*2, and 8*b* illustrate processing examples of the field value acquisition process. FIGS. 8*a*1, 8*a*2 , and 8*b* illustrate the field value acquisition process in the case where a value of "Size" field in the table B 250 is acquired. Assuming now that the index of the "Size" field for the table B 250 is in the state as shown in FIG. 8*a*1, a value in the "Size" field of the record having the record number "5" in the table B 250 is acquired as the following.

In this situation, the value "1" is acquired, which is placed on the rank "5" in VNo, being the same number as the record number "5", and then, a value in CF is obtained, which is in the entry on the rank "1" in CF being the same value as the acquired value "1". The value in the entry on the rank "1" in CF stays as initial value "0", indicating that the unit conversion has not been applied to the value on the entry on the rank "1" in VL. Accordingly, the value "27.94" expressed in centimeters on the rank "1" in VL is converted into inches, and the value "11", which is expressed in inches, is registered in the entry on the rank "1" in VLC. Then, the value "11" registered in the entry on the rank "1" in VLC is acquired as the value of the "Size" field of the record having the record number "5" in the table B 250.

Since the unit conversion is applied to the value in the entry on the rank "1" in VL, and the converted value is registered in the entry on the same rank in VLC, as shown in FIG. 8*a*2, value "1" is set in the entry on the rank "1" in CF, so as to indicate that the unit conversion has already been applied to the value in the entry on the rank "1" in VL.

Figure 8B:
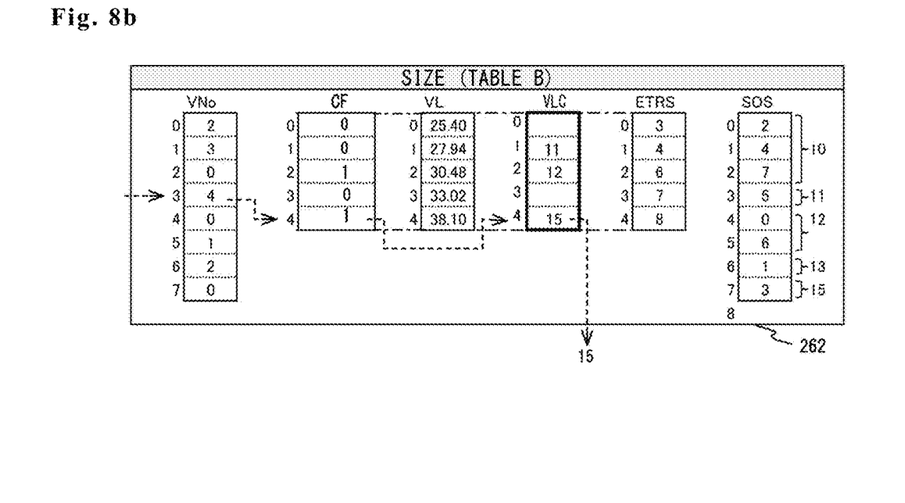

Assuming now that the index of the "Size" field for the table B 250 is in the state as shown in FIG. 8*b*, a value in the "Size" field of the record having the record number "3" in the table B 250 is acquired as the following.

For this case, the value "4" is acquired, which is placed on the rank "3" in VNo, being the same number as the record number "3", and further a value in the entry on the rank "4" in CF is obtained, which corresponds to the acquired value "4". The value in the entry on the rank "4" in CF is "1", indicating that the unit conversion has already been applied to the value in the entry on the rank "4" in VL. Accordingly, the value "15" registered in the entry on the rank "4" in VLC is acquired as the value in the "Size" field of the record having the record number "3" in the table B 250.

The second embodiment of the present invention has been described so far. In the aforementioned second embodiment, it is alternatively possible to eliminate VLC in the index, and update the entry in VL with the converted value, which is obtained by applying the unit conversion to the value registered in each entry in VL itself. For this case, in the step of the field value acquisition process 710, after the unit of the value in the k-th entry in VL is converted into a value of the local system of units, the value in the k-th entry in VL is updated with the converted value. In addition, in step 714, the value in the k-th entry in VL is acquired as the target field value.

The embodiment of the present invention has been described so far. As discussed above, according to the present embodiment, unit conversion is applied to the value registered in each entry of VL, and the converted value is registered in the entry of VLC, or the value in the entry of VL is updated with the converted value. Consequently, it is no further necessary to perform unit conversion redundantly, with regard to an already-converted value, whenever a record having that value in the pertinent field is processed. In addition, as for a large-scale table, it is expected that the number of entries in VL, corresponding to the number of values used as the field value, may be significantly reduced, relative to the number of records in the table. Therefore, compared to the case where the unit conversion is applied to the field values in all the records in the table, it is expected the unit conversion of the values registered in the entries of VL should be completed at high speed.

Thus, with the configuration above, unit conversion of data in a database can be achieved for efficient use of data.

What is claimed is:

1. An information processing system for processing a table having plural records each including one or plural fields, and record numbers being given to the records, respectively, the information processing system comprising,
   a storage memory including nontransitory computer readable media located thereon, and configured to store an index being provided in association with each field, and
   at least one processor configured to execute a program located on the nontransitory computer readable media to,
   perform index editing, and
   perform data processing to determine a field value of the record in the table, by using the index, wherein,
   the index comprises,
   a value list registering in entries, values used as the field values of the records in the table, and a correspondence list defining correspondence between the record number and a rank of each entry of the value list where the field values are registered, respectively in association with the records having the record numbers,
   the performance of index editing creates a list of values after unit conversion and a conversion flag list, in the index including the value list, as to each value list where values expressed in a unit different from a predetermined unit of the index are registered, and
   the performance of data processing determines as a field value of the record associated with the record number, a value registered in the entry of the value list at a rank associated with the record number as defined by the corresponding list of the index, when the list of values after unit conversion and the conversion flag list do not exist in the associated index for the field value; determines as the field value of the record associated with the record number, a value obtained by converting the value registered in the entry of the value list on the rank associated with the record as defined by the correspondence list, into a value expressed in the predetermined unit, when the list of values after unit conversion and the conversion flag list exist in the associated index for the field value and an on-flag indicating conversion is already done is not registered in the entry in the conversion flag list on the rank associated with the record number as defined by the correspondence list in the index, followed by registering thus converted value into the entry of the list of values after unit conversion on the same rank as the entry of the value list, and registering the on-flag into the entry of the conversion flag list on the rank associated with the record number as defined by the correspondence list; and determines as the field value of the record associated with the record number, a value registered in the entry of the list of values after unit conversion on the rank associated with the record number as defined by the correspondence list, when the list of values after unit conversion and the conversion flag list exist in the associated index, and the on-flag is registered in the entry of the conversion flag list on the rank associated with the record number as defined by the correspondence list of the index,
   wherein efficient unit conversion is achieved to lower a load required of the at least one processor.

2. An information processing system for processing a table having plural records each including one or plural fields, and record numbers being given to the records, respectively, the information processing system comprising,
   a storage memory including nontransitory computer readable media thereon and configured to store an index being provided in association with each field, and
   at least one processor configured to execute a program located on the nontransitory computer readable media to,
   perform index editing, and
   perform data processing configured to determine a field value of the record in the table, by using the index, wherein,
   the index comprises,
   a value list registering in entries, values used as the field values of the records in the table, and a correspondence list defining correspondence between the record number and a rank of each entry of the value list where the field values are registered, respectively in association with the records having the record numbers,
   the performance of index editing creates a list of values after unit conversion and a conversion flag list, in the index including the value list, as to each value list where values expressed in a unit different from a predetermined unit of the index are registered, and
   the performance of data processing determines as the field value of the record associated with the record number, a value registered in the entry of the value list on the rank associated with the record number as defined by the corresponding list of the index, when the list of values after unit conversion and the conversion flag list do not exist in the associated index of the record; determines as the field value of the record associated with the record number, a value obtained by converting the value registered in the entry of the value list on the rank associated with the record number as defined by the correspondence list, into a value expressed in the predetermined unit, when the list of values after unit conversion and the conversion flag list exist in the index and an on-flag indicating conversion is already done is not registered in the entry of the conversion flag list on the rank associated with the record number as defined by the corresponding list of the index, followed by updating the value in the entry of the value list, to the value being converted, registering the on-flag in the entry of the conversion flag list on the rank associated the record number as defined by the correspondence list; and determines as the field value of the record associated with the record number, the value registered in the entry of the value list on the rank associated with the record number as defined by the correspondence list, when the list of values after unit conversion and the conversion flag list exist in the associated index, and the on-flag is registered in the entry of the list of conversion flag list on the rank associated with the record number as defined by the correspondence list of the index, wherein efficient unit conversion is achieved to lower a load required of the at least one processor.

3. A computer program that is readable and executable by a computer, wherein,
the computer includes
an information processing system for processing a table having plural records each including one or plural fields, and record numbers being given to the records, respectively, the information processing system comprising,
a storage memory including nontransitory computer readable media thereon and configured to store an index being provided in association with each field, and
at least one processor configured to execute a program located on the nontransitory computer readable media to,
perform index editing, and
perform data processing configured to determine a field value of the record in the table, by using the index, wherein,
the index comprises,
a value list registering in entries, values used as the field values of the records in the table, and a correspondence list defining correspondence between the record number and a rank of each entry of the value list where the field values are registered, respectively in association with the records having the record numbers,
the performance of index editing creates a list of values after unit conversion and a conversion flag list, in the index including the value list, as to each value list where values expressed in a unit different from a predetermined unit of the index are registered, and
the performance of data processing determines as the field value of the record associated with the record number, a value registered in the entry of the value list on the rank associated with the record number as defined by the corresponding list of the index, when the list of values after unit conversion and the conversion flag list do not exist in the associated index of the record; determines as the field value of the record associated with the record number, a value obtained by converting the value registered in the entry of the value list on the rank associated with the record number as defined by the correspondence list, into a value expressed in the predetermined unit, when the list of values after unit conversion and the conversion flag list exist in the index and an on-flag indicating conversion is already done is not registered in the entry of the conversion flag list on the rank associated with the record number as defined by the corresponding list of the index, followed by updating the value in the entry of the value list, to the value being converted, registering the on-flag in the entry of the conversion flag list on the rank associated the record number as defined by the correspondence list; and determines as the field value of the record associated with the record number, the value registered in the entry of the value list on the rank associated with the record number as defined by the correspondence list, when the list of values after unit conversion and the conversion flag list exist in the associated index, and the on-flag is registered in the entry of the list of conversion flag list on the rank associated with the record number as defined by the correspondence list of the index, wherein efficient unit conversion is achieved to lower a load required of the at least one processor, and
the computer program causes the computer to function as the information processing system.

4. A computer program that is readable and executable by a computer, wherein,
the computer includes
an information processing system for processing a table having plural records each including one or plural fields, and record numbers being given to the records, respectively, the information processing system comprising,
a storage memory including nontransitory computer readable media located thereon, and configured to store an index being provided in association with each field, and
at least one processor configured to execute a program located on the nontransitory computer readable media to,
perform index editing, and
perform data processing to determine a field value of the record in the table, by using the index, wherein,
the index comprises,
a value list registering in entries, values used as the field values of the records in the table, and a correspondence list defining correspondence between the record number and a rank of each entry of the value list where the field values are registered, respectively in association with the records having the record numbers,
the performance of index editing creates a list of values after unit conversion and a conversion flag list, in the index including the value list, as to each value list where values expressed in a unit different from a predetermined unit of the index are registered, and
the performance of data processing determines as a field value of the record associated with the record number, a value registered in the entry of the value list at a rank associated with the record number as defined by the corresponding list of the index, when the list of values after unit conversion and the conversion flag list do not exist in the associated index for the field value; determines as the field value of the record associated with the record number, a value obtained by converting the value registered in the entry of the value list on the rank associated with the record as defined by the correspondence list, into a value expressed in the predetermined unit, when the list of values after unit conversion and the conversion flag list exist in the associated index for the field value and an on-flag indicating conversion is already done is not registered in the entry in the conversion flag list on the rank associated with the record number as defined by the correspondence list in the index, followed by registering thus converted value into the entry of the list of values after unit conversion on the same rank as the entry of the value list, and registering the on-flag into the entry of the conversion flag list on the rank associated with the record number as defined by the correspondence list; and determines as the field value of the record associated with the record number, a value registered in the entry of the list of values after unit conversion on the rank associated with the record number as defined by the correspondence list, when the list of values after unit conversion and the conversion flag list exist in the associated index, and the on-flag is registered in the entry of the conversion flag list on the rank associated with the record number as defined by the correspondence list of the index, wherein efficient unit conversion is achieved to lower a load required of the at least one processor, and the computer program causes the computer to function as the information processing system.

* * * * *